(12) United States Patent  (10) Patent No.: US 7,421,899 B2
Workman et al.  (45) Date of Patent: Sep. 9, 2008

(54) RESONANCE METHOD FOR DETERMINING THE SPRING CONSTANT OF SCANNING PROBE MICROSCOPE CANTILEVERS USING MEMS ACTUATORS

(75) Inventors: Richard K. Workman, Los Altos, CA (US); Storrs T. Hoen, Brisbane, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 84 days.

(21) Appl. No.: 11/458,000

(22) Filed: Jul. 17, 2006

(65) Prior Publication Data

US 2008/0011083 A1  Jan. 17, 2008

(51) Int. Cl.
*G01H 13/00* (2006.01)

(52) U.S. Cl. .............................. 73/579; 73/1.82; 73/105

(58) Field of Classification Search .................. 73/1.82, 73/105, 579
See application file for complete search history.

(56) References Cited

U.S. PATENT DOCUMENTS

| 6,145,374 | A  | * | 11/2000 | Zypman Niechonski et al. ......................... 73/105 |
| 6,799,464 | B2 | * | 10/2004 | Guerra-Vela et al. .......... 73/579 |
| 2006/0267596 | A1 | * | 11/2006 | Cumpson .................... 324/601 |

* cited by examiner

*Primary Examiner*—John E Chapman

(57) ABSTRACT

In accordance with the invention, the spring constant of a scanning probe microscope cantilever mechanically coupled to a microelectromechanical system (MEMS) actuator may be determined in-situ using a frequency resonance method.

19 Claims, 8 Drawing Sheets

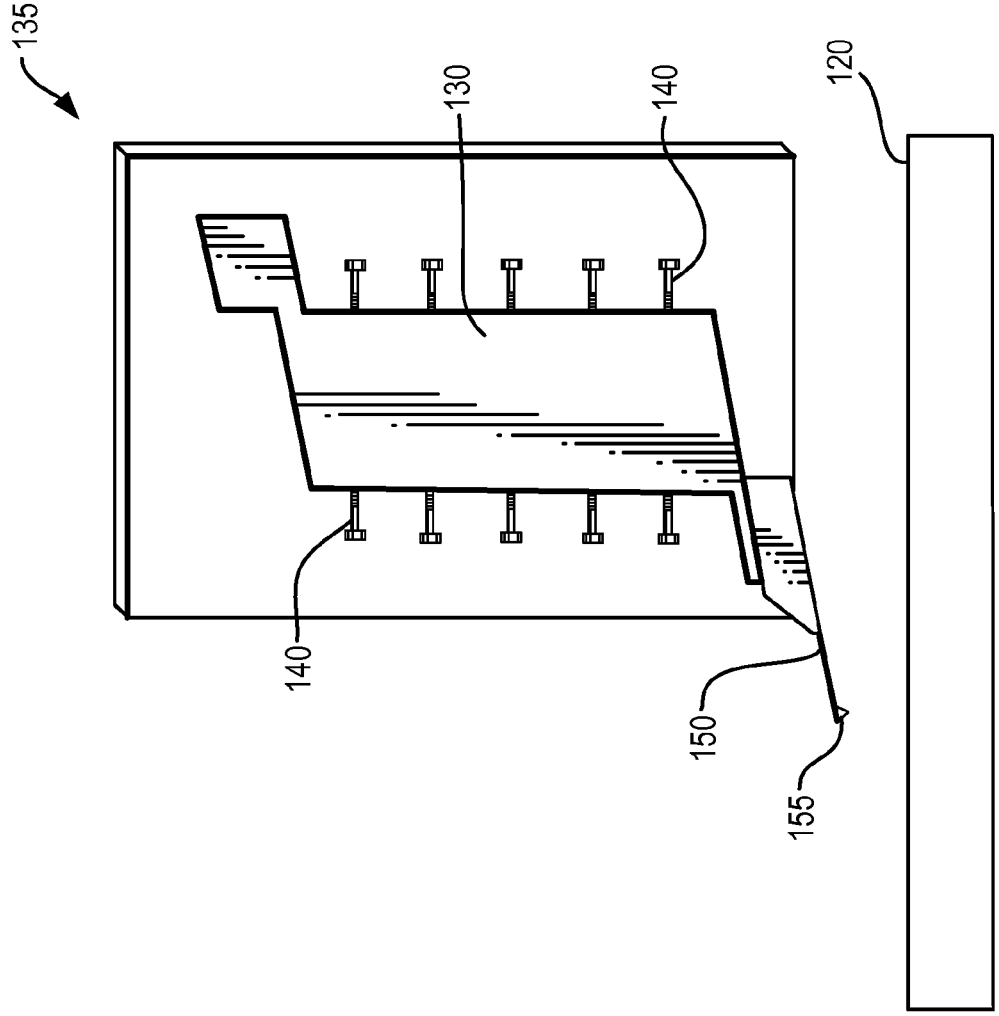

RESONANCE METHOD FOR DETERMINING THE SPRING CONSTANT OF SCANNING PROBE MICROSCOPE CANTILEVERS USING MEMS ACTUATORS

CROSS REFERENCE TO RELATED APPLICATIONS

This application relates to U.S. patent application Ser. No. 11/458,012, filed on the same day and entitled "Displacement Method for Determining the Spring Constant of Scanning Probe Microscope Cantilevers using MEMS Actuators" by Workman, Hoen and Clifford, and to U.S. patent application Ser. No. 11/458,017, filed on the same day and entitled "Force Method for Determining the Spring Constant of Scanning Probe Microscope Cantilevers using MEMS Actuators" by Workman, Hoen and Clifford, both owned by the assignee of this application and both incorporated herein by reference.

BACKGROUND

Typically, it is difficult to measure the vertical and lateral spring constant of scanning probe microscope cantilevers accurately. The typical method of calibrating scanning probe microscope (SPM) cantilevers is the "Sader method", described, for example, by Sader, Chon and Mulvaney in "Calibration of rectangular atomic force microscopy cantilevers", Review of Scientific Instruments, 70(10), p. 3967, 1999 or by Cain et al. in "Force calibration in lateral force microscopy", Journal of Colloid and Interface Science 227, p. 55, 2000. The "Sader method" uses the length, width, resonance frequency, and quality factor, Q, of the scanning probe microscope cantilever to determine the spring constant. The "Sader method" does not depend on the optical lever sensitivity calibration.

Other methods for determining the spring constant include the thermal power spectral density method described by Hutter and Bechhoefer in "Calibration of atomic-force microscope tips", Review of Scientific Instruments, 64(7), p. 1868, 1993; the "Cleveland method", described by Cleveland in "A non-destructive method for determining the spring constant of cantilevers for scanning force microscopy", Review of Scientific Instruments, 64, p. 403, 1993; and the torsional MEMS method, described by Cumpson et al. in "Microelectromechanical system device for calibration of atomic force microscope cantilever spring constants between 0.01 and 4 N/m", Journal of Vacuum Science and Technology A, 22(4), p. 1444, 2004.

SUMMARY

In accordance with the invention, the spring constant of a scanning probe microscope cantilever mechanically coupled to a microelectromechanical system (MEMS) actuator may be determined in-situ using a frequency resonance method.

BRIEF DESCRIPTION OF THE DRAWINGS

FIGS. 1a-b shows an electrostatic MEMS motor.

DETAILED DESCRIPTION

Figure 1B:
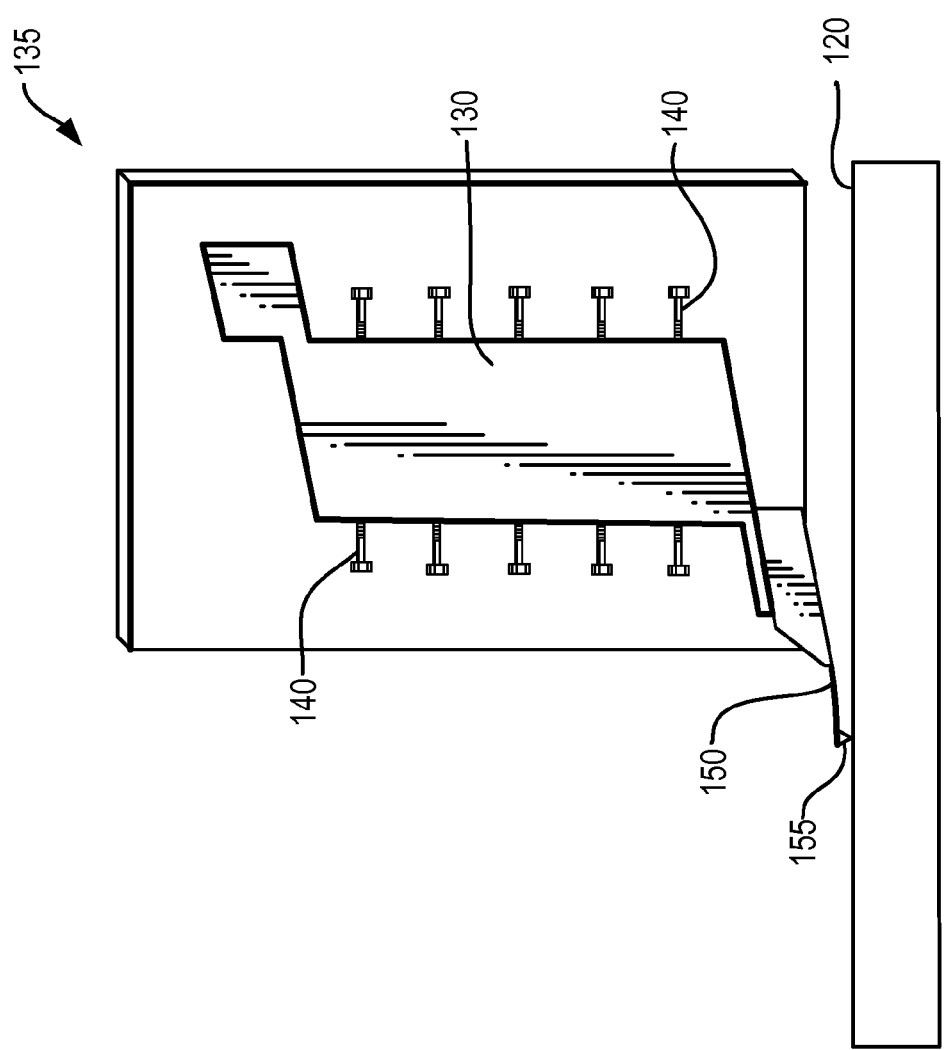

FIG. 1a shows scanning probe microscope cantilever 150 attached to electrostatic MEMS motor rotor 130 of electrostatic MEMS motor 135 in an embodiment in accordance with the invention. In this disclosure, the term rotor is used to describe the movable part of a MEMS actuator, such as an electrostatic MEMS motor or an electrostatic comb drive, regardless of whether such movable part moves laterally or rotates. Scanning probe microscope cantilever 150 is attached to electrostatic MEMS motor rotor 130 such that scanning probe microscope cantilever 150 extends past the boundary of electrostatic MEMS motor rotor 130 to allow the use of, for example, an optical lever technique to monitor the vertical position of scanning probe tip 155. The resonance frequency, $\omega_0$, of electrostatic MEMS motor rotor 130 is determined while scanning probe tip 155 is not in contact with surface 120. The resonance frequency, $\omega_{new}$, of electrostatic MEMS motor rotor 130 is then measured with scanning probe tip 155 in contact with surface 120 as shown in FIG. 1b and scanning probe microscope cantilever 150 is at the zero sensor position. Surface 120 is assumed to be sufficiently "hard" that scanning probe tip 155 moves less than about 10 percent as much as electrostatic MEMS motor rotor 130 or electrostatic comb drive rotor 182 (see FIG. 1c) when scanning probe tip 155 is brought into contact with surface 120. Methods for determining the resonance frequency are discussed below.

Figure 1C:
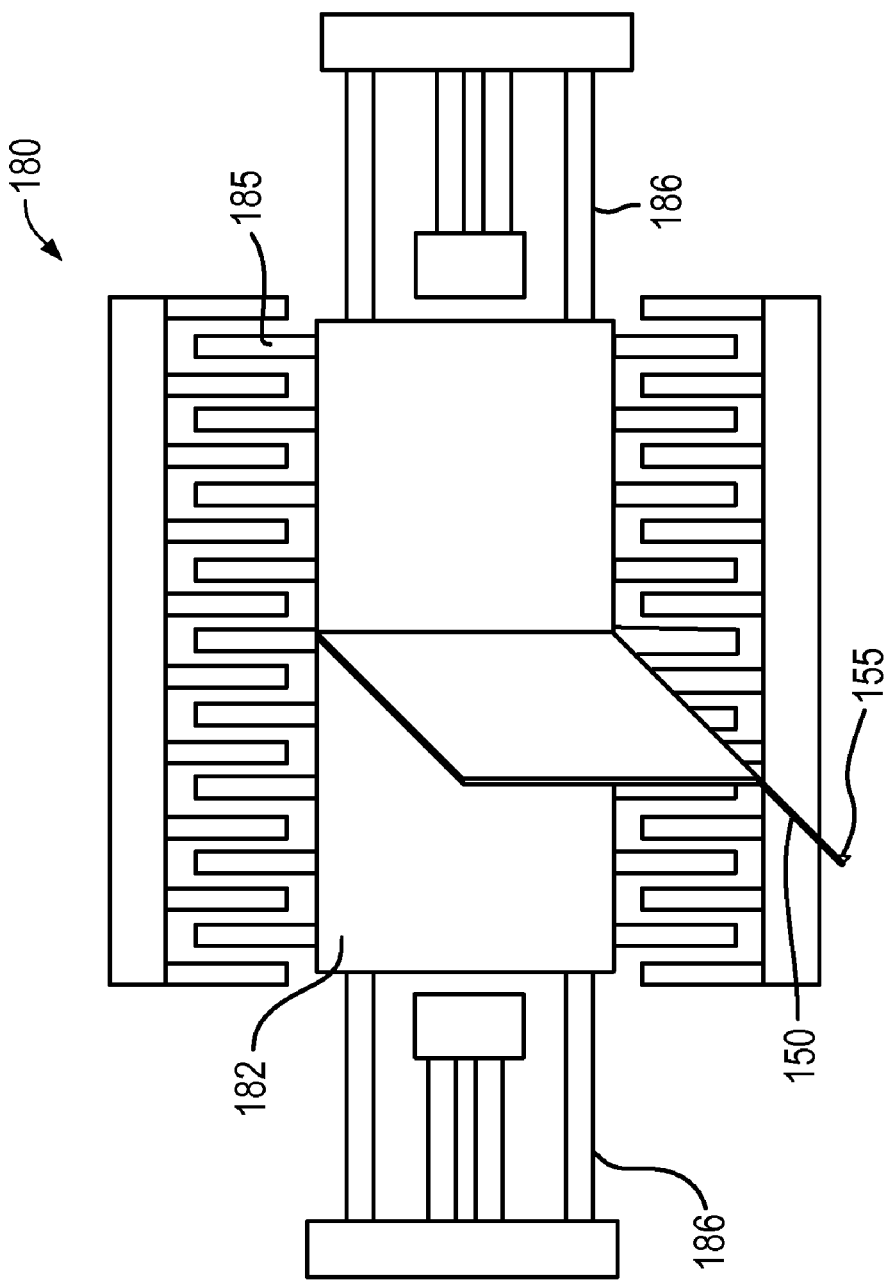
FIGS. 1c-d show an electrostatic comb drive.
Figure 1D:
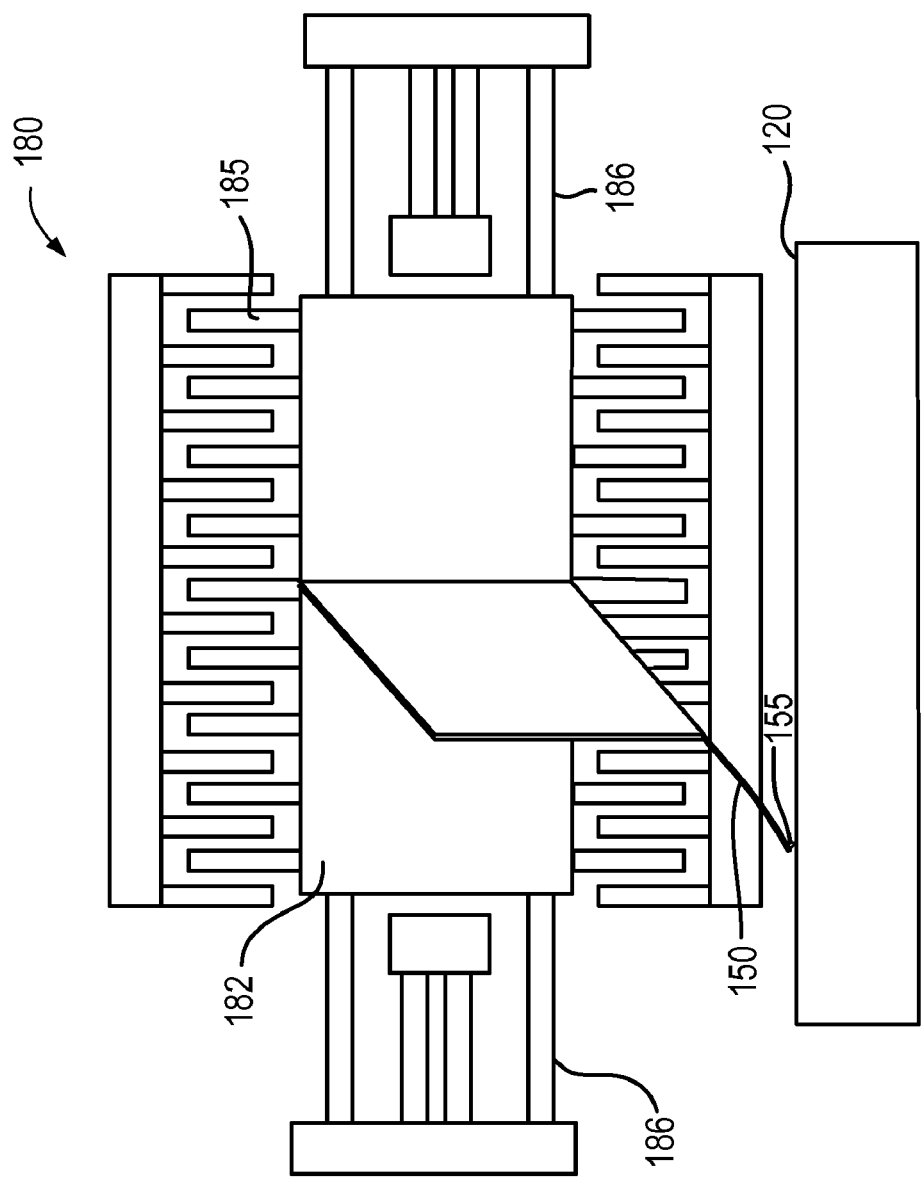
Figure 1E:
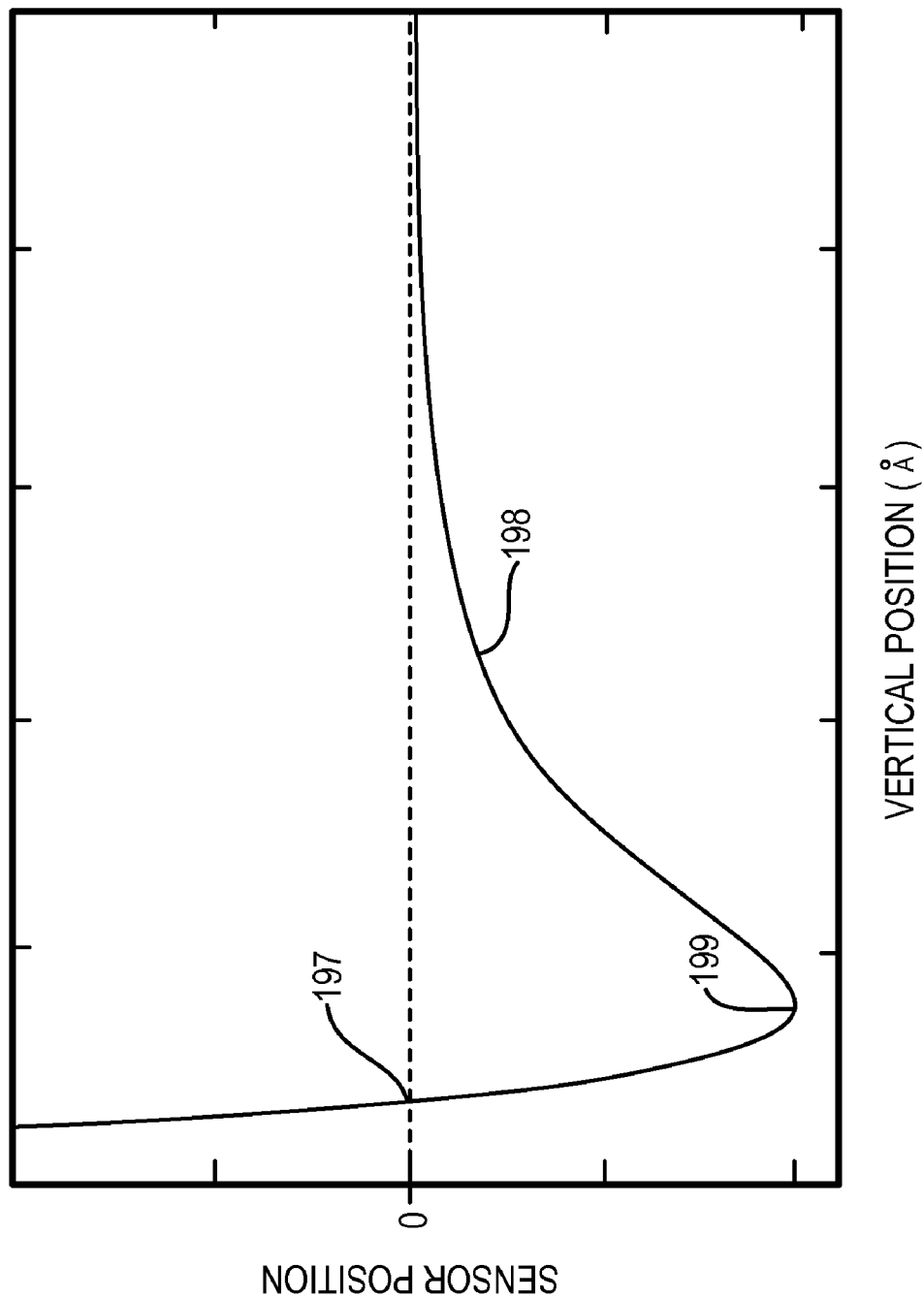
FIG. 1e shows the sensor position versus vertical probe position.

For the purposes of this description, contact between scanning probe tip 155 and surface 120 is defined as when the vertical position of scanning probe tip 155 is to the left of inflection point 199 of probe-surface interaction force 198 as shown in FIG. 1e. Note that the sensor position is proportional to probe-surface interaction force 198. The term "sensor position" refers to the position of the reflected optical beam on the bi-cell photodetector as described, for example, in U.S. Pat. No. 5,587,523 and incorporated herein by reference. The position of the reflected optical beam can be used to determine the vertical position of scanning probe tip 155. To simplify the discussion, the sensor is positioned so the zero of the sensor position readout corresponds to the situation when there are no surface forces acting on scanning probe tip 155 and corresponds to point 197 in FIG. 1e.

If the resonant frequency of electrostatic MEMS motor rotor 130 is less than the resonant frequency of cantilever 150 then the additional spring force provided by the force of scanning probe microscope cantilever 150 pushing on surface 120 raises the resonance frequency of electrostatic MEMS motor rotor 130 by an amount proportional to the spring constant of scanning probe microscope cantilever 150. The new resonance frequency of electrostatic MEMS motor rotor 130 is given by $$\omega_{new} = \sqrt{\frac{\kappa_{tip}}{m_{motor}} + \omega_0^2} \qquad (1)$$

where $m_{motor}$ is the mass of electrostatic MEMS motor rotor 130, cantilever 150 and scanning probe tip 155 and $\kappa_{tip}$ is the spring constant of scanning probe microscope cantilever 150. The spring constant of scanning probe microscope cantilever 150 is then given by:

$$\kappa_{tip} = m_{motor}(\omega_{new}^2 - \omega_0^2) \qquad (2)$$

which can be approximated by:

$$\kappa_{tip} = 2 m_{motor} \omega_0 (\omega_{new} - \omega_0) \qquad (3)$$

for $\omega_0^2 \gg \kappa_{tip}/m_{motor}$.

For a conventional piezoelectric actuator used with typical scanning probe microscopes, typical values are $m_{motor} \approx 0.1$ kg, $\omega_0 \approx 400\pi$ Hz and $\kappa_{tip} \approx 0.1$ N/m which gives a frequency difference, $(\omega_{new} - \omega_0)$, of 0.0004 Hz. A frequency difference of this magnitude is typically difficult to accurately measure. On the other hand, using electrostatic MEMS motor rotor 130 with $m_{motor} \approx 10^{-6}$ kg typically gives a measurable frequency difference of about 2 Hz. Typical values for $\omega_0$ are in the range from about $4\pi$ kHz to about $80\pi$ kHz and typical values for $\kappa_{tip}$ are in the range from about 0.05 N/m to about 100 N/m. This method in accordance with the invention allows determination of the spring constant, $\kappa_{tip}$, independently of the geometry, optical lever calibration or other properties of scanning probe microscope cantilever 150.

Other MEMS actuators may be used in accordance with the invention. For example, an electrostatic comb drive may be used in place of electrostatic MEMS motor 135. FIG. 1c shows scanning probe microscope cantilever 150 attached to electrostatic comb drive rotor 182 of electrostatic comb drive 180 in an embodiment in accordance with the invention. Scanning probe microscope cantilever 150 is attached to electrostatic comb drive rotor 130 such that scanning probe microscope cantilever 150 extends past the boundary of electrostatic comb drive rotor 182 to allow the use of, for example, an optical lever technique to monitor the vertical position of scanning probe tip 155. The resonance frequency, $\omega_0$, of electrostatic comb drive rotor 182 is determined while scanning probe tip 155 is not in contact with surface 120 (see FIG. 1d). The resonance frequency, $\omega_{new}$, of electrostatic comb drive rotor 182 is measured with scanning probe tip 155 in contact with surface 120 as shown in FIG. 1d and scanning probe microscope cantilever 150 is at the zero sensor position. The analysis for determining the spring constant, $\kappa_{tip}$, of scanning probe microscope cantilever 150 using the resonance frequency of electrostatic comb drive rotor 182 follows the discussion above for scanning probe microscope cantilever 150 using electrostatic MEMS motor 135.

Figure 2A:
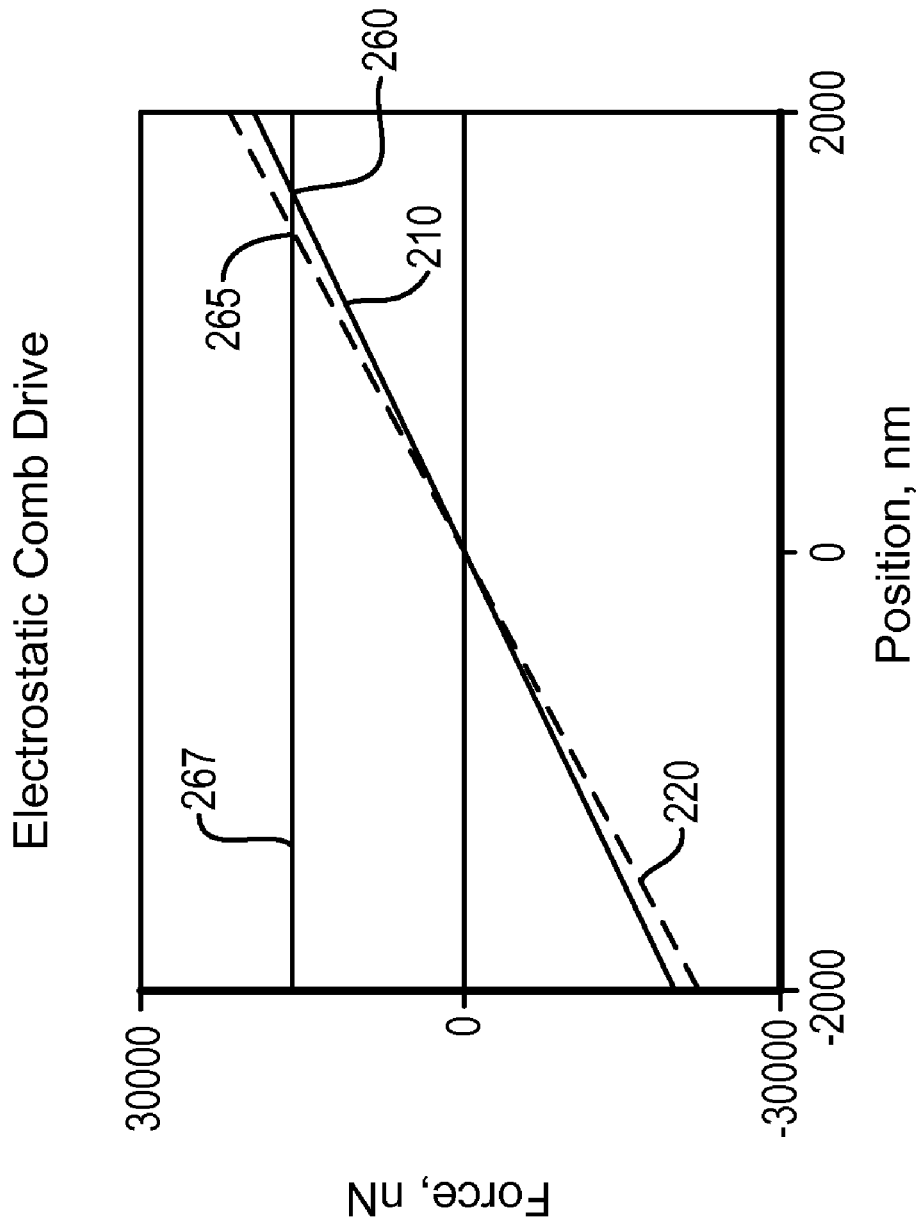
FIG. 2a shows force versus position curves for an electrostatic comb drive in accordance with the invention.
Figure 2B:
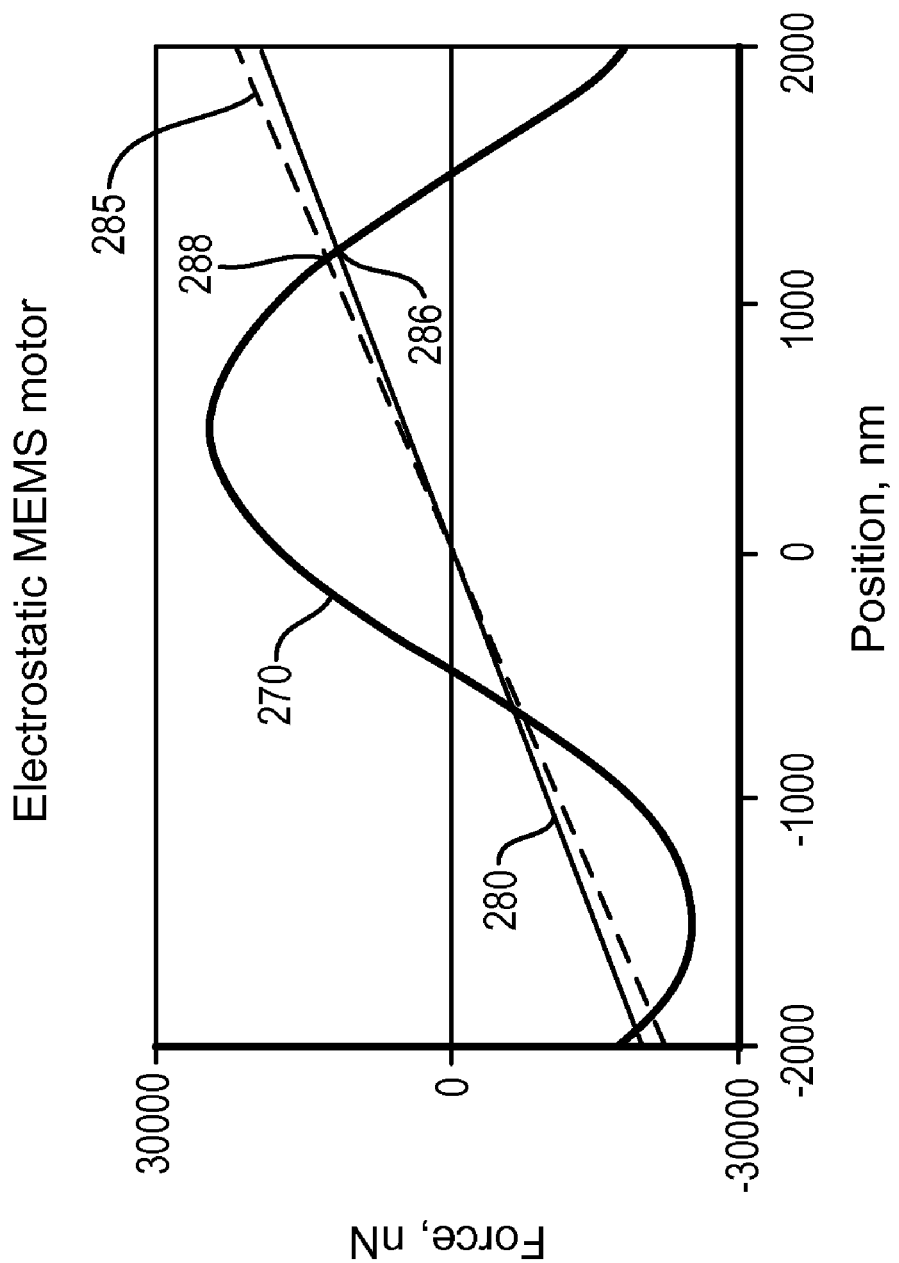
FIG. 2b shows force versus position curves for an electrostatic MEMS motor in accordance with the invention.

The particular electrostatic MEMS actuator selected effects the relationship between the measured frequencies and the spring constant, $\kappa_{tip}$, of scanning microscope cantilever 150. FIGS. 1a and 1b show electrostatic MEMS motor 135 which is a surface drive actuator while FIGS. 1c and 1d show electrostatic comb drive 180. FIGS. 2a and 2b show force versus position curves for electrostatic comb drive 180 and electrostatic MEMS motor rotor 135, respectively. For both electrostatic comb drive 180 and electrostatic MEMS motor 135, the force versus position curves are the sum of three components: the force of springs 140 or 186 that constrain electrostatic MEMS motor rotor 130 or electrostatic comb drive rotor 182, the electrostatic force generated by electrostatic MEMS motor rotor 130 or electrostatic comb drive rotor 182 and the force from scanning probe microscope cantilever 150 or scanning probe microscope cantilever 150, respectively. The force from scanning probe microscope cantilever 150 is present only if scanning probe tip 155 is in contact with surface 120.

For electrostatic comb drive 180 as described by, for example, R. Legtenberg, A.W. Groeneveld and M. Elwenspoek in "Comb-drive actuators for large displacements", Journal of Micromechanics and Microengineering, 6, pp. 320-329, 1996, incorporated herein by reference, the electrostatic force can be approximated as follows:

$$F \approx \frac{\varepsilon_0 L V_{applied}^2}{d} \quad (4)$$

where L is the sum of the thicknesses of all comb fingers 185 in electrostatic comb drive 180, and d is the gap distance between the opposed surfaces of interleaved ones of the comb fingers. From Equation (4), it can be seen that the electrostatic force, F, is essentially independent of position. At equilibrium, the electrostatic force is equal to and the negative of the spring forces contributed by springs 186 and scanning probe microscope cantilever 150. This allows the rest position of electrostatic comb drive 180 to be determined by considering where the negative of the spring forces are equal to the force generated by electrostatic comb drive 180. In FIG. 2a, curve 210 shows the negative of the spring forces as a function of position when scanning probe tip 150 is not in contact with surface 120 and curve 220 shows the negative spring forces as a function of position when scanning probe tip is in contact with surface 120 When scanning probe microscope cantilever 150 is not in contact with surface 120, the equilibrium position of electrostatic comb drive 180 is shown by non-contact point 260 in FIG. 2a. When scanning probe tip 150 is in contact with surface 120, an additional spring force is added due to the spring force contributed by scanning probe microscope cantilever 155 and the equilibrium position of electrostatic comb drive 180 moves and is shown by contact point 265 in FIG. 2a. Because force curve 267 for electrostatic comb drive 180 is essentially independent of position, changes in resonant frequency are due to the spring force contributed by scanning probe microscope cantilever 155 when scanning probe tip 150 is in contact with surface 120.

For electrostatic MEMS motor 135 as described in, for example, U.S. Pat. No. 5,986,381, incorporated herein by reference, the electrostatic force is not independent of position. The electrostatic force is typically periodic with the rotor position and for electrostatic MEMS motor rotor 130 the electrostatic force is a sinusoidal function of position as shown by curve 270 in FIG. 2b. The amplitude of the electrostatic force depends on the applied voltage and the position of the zero crossing depends on the specific voltage pattern applied to electrostatic MEMS motor 135. In FIG. 2b, the force of springs 140 with position is shown by curve 280 and the force of springs 140 plus the force due to the contact of scanning probe tip 155 in contact with surface 120 with position is shown by curve 285. Electrostatic MEMS motor 135 is at rest in equilibrium position 286 when scanning probe tip 155 is not in contact with surface 120. Equilibrium position 286 occurs where curve 280 intersects curve 270. When scanning probe tip 155 is in contact with surface 120, an additional spring force due to scanning microscope cantilever 150 results in new equilibrium position 288 which is where curve 285 intersects curve 270. Equilibrium position 286 and the associated resonance frequency depend on the functional form of the electrostatic force curve. For small changes in position as shown in FIG. 2b, electrostatic force curve 270 can be approximated as a straight line.

The resonance frequency, $\omega_n$, may be measured by observing the response of electrostatic MEMS motor rotor 130 to a step, pulse or swept-sine forcing function. Measurement of the resonance frequency, $\omega_n$, is performed using a sensor which does not affect the result such as an optical or capacitive sensor.

In particular, one way to determine the resonance frequency, $\omega_n$, of electrostatic MEMS rotor motor 130 in accordance with the invention is to apply a low voltage sine wave, typically about 0.025 of the overall bias voltage, to the disrupter electrode (not shown, see for example, U.S. Pat. No. 5,986,381) of electrostatic motor 135. The voltage signal from the capacitive position sensor (not shown) is then multiplied by the applied sine wave voltage and averaged over several periods to produce a sine mixed signal. The voltage signal from the capacitive position sensor is also multiplied by a signal that is 90 degrees out of phase with the applied sine wave voltage and average over several periods to produce a cosine mixed signal. The sine mixed signal is combined in quadrature with the cosine mixed signal to give the signal magnitude. The frequency of the applied sine wave voltage is then typically varied by several Hz to determine the signal magnitude as a function of frequency. The resonant frequency occurs when the signal magnitude is a maximum. Alternatively, the resonant frequency may be found by noting the frequency where the sine mixed signal crosses zero.

Similar methods for determining the resonance frequency, $\omega_n$, may be used for other MEMS actuators such as electrostatic comb drive 180 where the mass of electrostatic comb drive rotor 182 is used in place of the mass of electrostatic MEMS motor rotor 130. Note that the resonance frequency, $\omega_n$, is not necessarily the lowest resonance frequency. For example, it is possible to design electrostatic comb drives 180 where the vibration of probe tip 155 is not parallel to the desired direction of probe tip travel at the lowest resonance frequency. Here, it is necessary to go to a higher order resonance to obtain resonance motion that is parallel to the desired direction of travel for probe tip 155.

Figure 3:
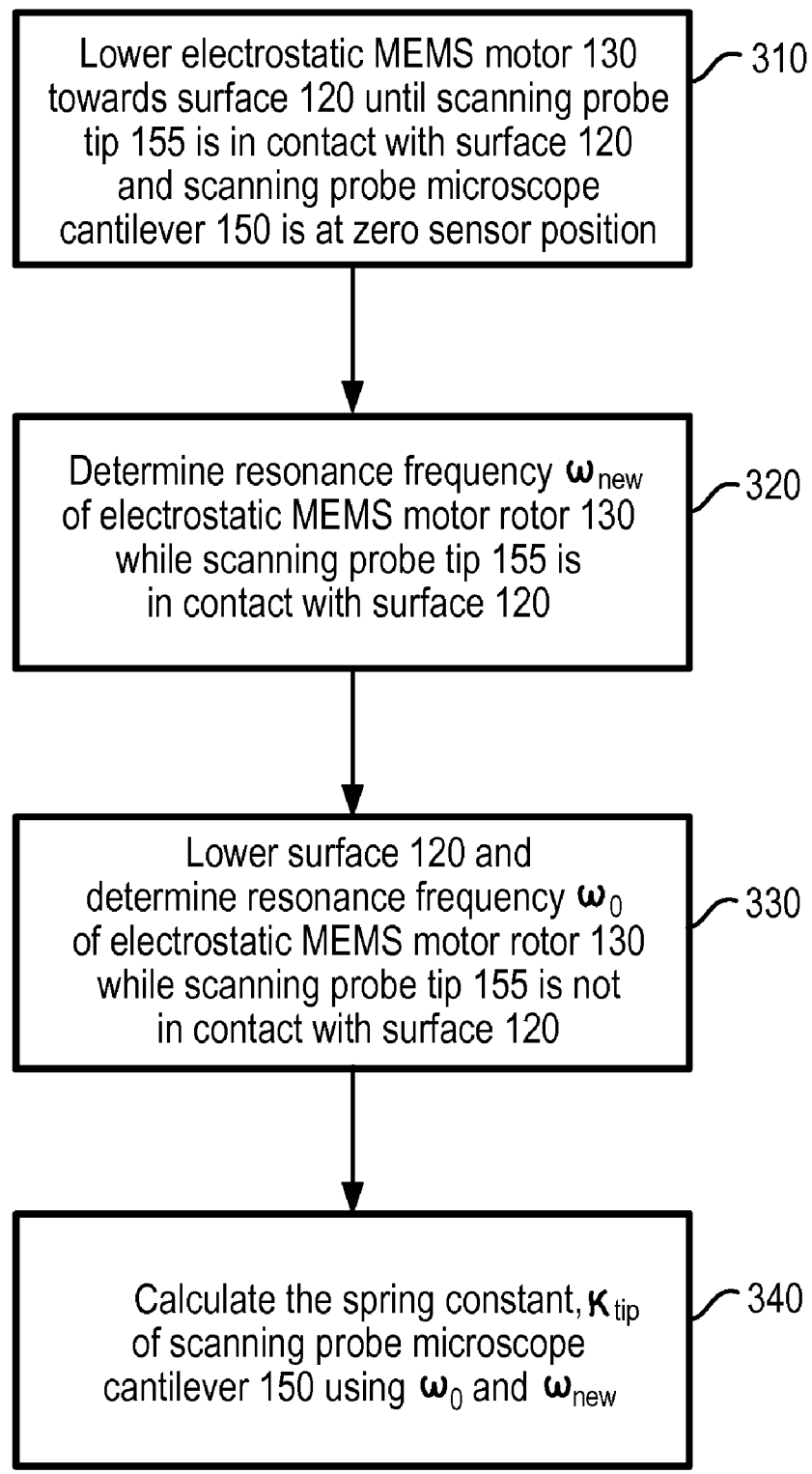
FIG. 3 shows an embodiment in accordance with the invention.

FIG. 3 shows the steps of an embodiment in accordance with the invention where electrostatic MEMS motor 135 is used as an example. Initially, in step 310, electrostatic MEMS motor rotor 130 is lowered until scanning probe tip 155 is in contact with surface 120 and scanning probe microscope cantilever 150 is substantially at the zero sensor position (see FIG. 1e). Alternatively, surface 120 may be raised until surface 120 is in contact with scanning probe tip 155 but this typically results in a less controllable sensor position. Next, in step 320, the resonance frequency, $\omega_{new}$, of electrostatic MEMS motor rotor 130 is determined while scanning probe tip 155 is in contact with surface 120. Then, in step 330, the resonance frequency, $\omega_0$, of electrostatic MEMS motor rotor 130 is determined after surface 120 has been lowered so that scanning probe tip 155 is no longer in contact with surface 120. Then in step 340, the spring constant, $\kappa_{tip}$, of scanning probe microscope cantilever 150 is calculated as described above. Note that one may start with step 330 and then proceed to step 310 after electrostatic MEMS motor rotor 130 is lowered but this typically changes the applied voltage which introduces an additional variable, thereby complicating the analysis for certain electrostatic MEMS actuators such as electrostatic MEMS motor 135. The method in accordance with the invention described above provides that the position of electrostatic MEMS motor rotor 130 relative to curves 285 and 280 is identical during the two resonance measurements because cantilever 150 is in the same position so that points 288 and 286 lie on top of one another. The example of electrostatic MEMS motor 135 is illustrative and any suitable MEMS actuator such as electrostatic comb drive 180 discussed above may be used in accordance with the invention. For electrostatic comb drive 180, electrostatic comb drive rotor 182 replaces electrostatic MEMS motor rotor 130 in the above discussion and in FIG. 2

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A method for determining a spring constant of a scanning probe microscope cantilever mechanically coupled to a MEMS actuator comprising:
   determining a second resonance frequency of said MEMS actuator while a scanning probe tip mechanically coupled to said scanning probe microscope cantilever is in contact with a surface;
   determining a first resonance frequency of said MEMS actuator while said scanning probe tip mechanically coupled to said scanning probe microscope cantilever is not in contact with said surface; and
   calculating said spring constant using said first and said second resonance frequency.

2. The method of claim 1 wherein said MEMS actuator comprises an electromagnetic drive.

3. The method of claim 1 wherein said MEMS actuator comprises an electrostatic drive.

4. The method of claim 1 wherein said scanning probe tip is brought into contact with said surface.

5. The method of claim 1 wherein said surface is lowered such that said scanning probe microscope probe tip is not in contact with said surface.

6. The method of claim 4 further comprising keeping said scanning probe microscope cantilever position at a zero sensor position.

7. The method of claim 1 wherein said first resonance frequency is not the lowest resonance frequency of said MEMS actuator.

8. The method of claim 1 wherein a frequency difference between said first and said second resonance frequency is on the order of several hertz.

9. A method for determining a spring constant of a scanning probe microscope cantilever mechanically coupled to a MEMS motor rotor comprising:
   determining a second resonance frequency of said MEMS motor rotor while a scanning probe tip mechanically coupled to said scanning probe microscope cantilever is in contact with a surface;
   determining a first resonance frequency of said MEMS motor rotor while said scanning probe tip mechanically coupled to said scanning probe microscope cantilever is not in contact with said surface; and
   calculating said spring constant using said first and said second resonance frequency.

10. The method of claim 9 wherein said MEMS motor rotor is an electrostatic MEMS drive motor rotor.

11. The method of claim 9 wherein said scanning probe tip is brought into contact with said surface by lowering said MEMS motor rotor.

12. The method of claim 11 further comprising keeping said scanning probe microscope cantilever position at a zero sensor position.

13. The method of claim 9 wherein said surface is lowered such that said scanning probe microscope probe tip is not in contact with said surface.

14. The method of claim 9 wherein a frequency difference between said first and said second resonance frequency is on the order of several hertz.

15. A method for determining a spring constant of a scanning probe microscope cantilever mechanically coupled to an electrostatic comb drive rotor comprising:

determining a second resonance frequency of said electrostatic comb drive rotor while a scanning probe tip mechanically coupled to said scanning probe microscope cantilever is in contact with a surface;

determining a first resonance frequency of said electrostatic comb drive rotor while said scanning probe tip mechanically coupled to said scanning probe microscope cantilever is not in contact with said surface; and calculating said spring constant using said first and said second resonance frequency.

16. The method of claim 15 wherein said first resonance frequency is not the lowest resonance frequency of said electrostatic comb drive rotor.

17. The method of claim 15 wherein said scanning probe tip is brought into contact with said surface by lowering said electrostatic comb drive rotor.

18. The method of claim 15 wherein said surface is lowered such that said scanning probe microscope probe tip is not in contact with said surface.

19. The method of claim 15 wherein a frequency difference between said first and said second resonance frequency is on the order of several hertz.

* * * * *